(12) United States Patent
MacGregor et al.

(10) Patent No.: US 11,634,087 B1
(45) Date of Patent: Apr. 25, 2023

(54) HOUSING STRUCTURE FOR A VEHICLE MOUNTED OPTICAL DEVICE

(71) Applicant: Amazon Technologies, Inc., Seattle, WA (US)

(72) Inventors: Mike MacGregor, Seattle, WA (US); Ian Beck Jordan, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/476,848

(22) Filed: Sep. 16, 2021

(51) Int. Cl.
*B60R 11/04* (2006.01)
*H04N 5/225* (2006.01)
*B60R 11/00* (2006.01)

(52) U.S. Cl.
CPC ........... *B60R 11/04* (2013.01); *H04N 5/2252* (2013.01); *B60R 2011/004* (2013.01); *B60R 2011/0043* (2013.01)

(58) Field of Classification Search
CPC .............. B60R 11/04; B60R 2011/004; B60R 2011/0043; H04N 5/2252
See application file for complete search history.

(56) References Cited

U.S. PATENT DOCUMENTS

| | | | | |
|---|---|---|---|---|
| 3,635,517 A | * | 1/1972 | Wilfert | B60Q 1/0005 |
| | | | | 362/293 |
| 4,838,603 A | * | 6/1989 | Masoero | B60Q 1/0005 |
| | | | | 296/180.1 |
| 2018/0091714 A1 | * | 3/2018 | Hendricks | G03B 17/561 |
| 2022/0266802 A1 | * | 8/2022 | Li | B60S 1/566 |

FOREIGN PATENT DOCUMENTS

| | | | | |
|---|---|---|---|---|
| CN | 209972340 U | * | 1/2020 | |
| DE | 102017221505 A1 | * | 6/2019 | |
| WO | WO-2021004827 A1 | * | 1/2021 | ............... B60R 1/06 |

* cited by examiner

*Primary Examiner* — Timothy J Henn
(74) *Attorney, Agent, or Firm* — Thomas | Horstemeyer, LLP (57) ABSTRACT

A housing apparatus configured to be attached to an external housing of a vehicle mounted optical device is described. The housing apparatus is configured to direct an airflow at a lens of the optical device in order to prevent or remove obstructions, such as rain, dirt, pollen, insects, and other items. In one embodiment, among others, an apparatus comprises a tunnel structure that has a first end, a second end, a first side, a second side, and a top side. The first end of the tunnel structure has an entry opening for capturing air flow while the vehicle is in motion. The second end of the tunnel structure has an exit opening for directing the air flow to a lens of the optical device.

17 Claims, 8 Drawing Sheets

HOUSING STRUCTURE FOR A VEHICLE MOUNTED OPTICAL DEVICE

BACKGROUND

Optical devices can be installed in a vehicle for a variety of reasons. For example, a camera can be used to collect imagery along a road. Other examples may include optical devices used for Light Detection and Ranging (LiDAR) applications and for training autonomous vehicle models.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure involves various embodiments of a housing assembly that passively removes obstructions that would impact a lens of a vehicle mounted optical device or a viewable window for the optical device. Additionally, the housing assembly can prevent obstructions from attaching to the lens or viewable window for the optical device. An optical device (e.g., a camera) can be externally mounted to a vehicle for a variety of reasons. For example, an externally mounted vehicle camera may have a better field of view for camera-based applications and uses. For instance, an externally mounted vehicle camera can be used to collect camera imagery along a road. Other examples of the need for an externally mounted vehicle optical devices can include Light Detection and Ranging (LiDAR) applications and for training autonomous vehicle models. Additionally, externally mounted optical devices allow for the selection of optical devices with the most advanced specifications and features.

However, while in use, an externally mounted vehicle optical device is exposed to outside elements and the exposure can impact the performance of the optical device. The outside elements can include obstructions such as rain, snow, leaves, pollen, insects, bird excrement, and other potential obstructions. As such, the various embodiments are directed to a housing apparatus that can remove these obstructions by capturing an air flow and directing the air flow at a lens of the optical device or a windshield in front of a lens for the optical device. Additionally, the redirected air flow can be used to prevent obstructions or debris from attaching to a lens or a windshield for an optical device.

Figure 1A:
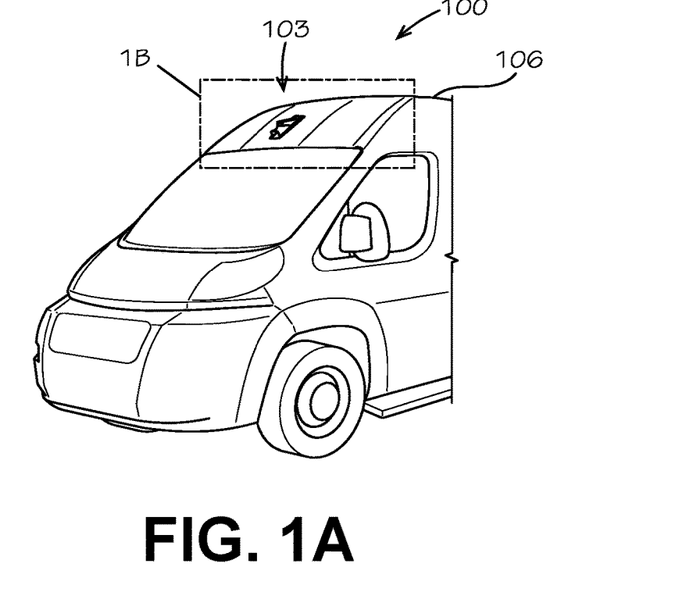
FIGS. 1A and 1B are drawings of a vehicle camera system, according to various embodiments of the present disclosure.
Figure 1B:
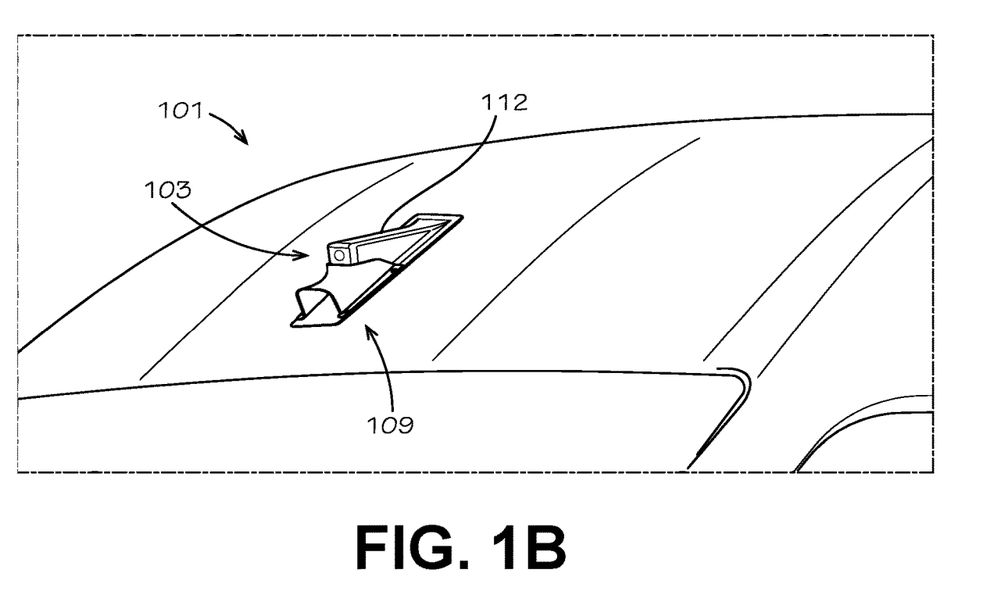

With reference to FIGS. 1A and 1B, shown are drawings of a vehicle camera system 100. The vehicle camera system 100 can include a housing assembly 101, a lens 103 for an optical device, a vehicle 106, and other system components. FIG. 1A is a perspective view of the vehicle camera system 100 in which the housing assembly 101 is mounted to vehicle 106, and FIG. 1B is an enlarged view of the housing assembly 101 from FIG. 1A. The housing assembly 101 includes a housing apparatus 109 (e.g., an air nozzle) attached to an external housing 112 of an optical device. The external housing 112 provides protection for the components of the optical device. The housing apparatus 109 is configured to remove obstructions from the lens 103 of the optical device or from a viewable window in front of the optical device by redirecting an air flow while the vehicle is in motion. Additionally, the housing apparatus 109 can prevent obstructions from attaching to the camera lens or viewable window for the camera. In some embodiments, the housing apparatus 109 can be referred to as an air nozzle.

The lens 103 can refer to a cover for an optical device, in which the cover can be comprised of translucent materials, transparent materials, or other suitable materials. In some embodiments, the lens 103 can cover a receiver component and/or a transmitter component of the optical device. The lens 103 can be comprised of glass, polycarbonate, and other suitable translucent/transparent materials. Some non-limiting examples of an optical device can include a camera, a light-sensing sensor, a laser, a LiDar system, and other suitable optical devices.

The housing apparatus 109 removes obstructions by passively capturing an air flow while a vehicle 106 is in motion. For example, as the vehicle 106 is in motion, a first end of the housing apparatus 109 can capture an air flow and the housing apparatus 109 can direct the air flow at the lens 103 of the optical device from a second end of the housing apparatus 109. The directed air flow can be used to create a shearing force that can remove obstructions that are attached to the camera lens, a windshield in front of a camera lens, or areas around the camera lens. A passive capture design of the air flow can be preferred over an active capture design for some implementations because an actively powered design can be far more complicated, costly, and subject to breakdowns.

In the depicted embodiment, the vehicle 106 can be used for a variety of different purposes in which an externally mounted optical device is desired. For example, an externally mounted optical device may be desired for tracking delivery routes of delivery vans, training autonomous vehicles, collecting imagery data for maps, and other suitable applications. In these applications, the optical device (e.g., a camera or a LiDar system) with advanced features and specifications may be required and can be quickly installed to the exterior surface of the vehicle 106. In contrast, oftentimes, original equipment manufacturers prefer to continue to use the same camera over a long period of time. As such, an integrated vehicle camera can become outdated. Even further, some vehicle manufacturers may not allow vehicle owners to access the integrated cameras or optical devices for custom optical applications.

The external housing 112 is attached to an exterior surface of the vehicle 106. In FIGS. 1A and 1B, the external housing 112 is positioned above the vehicle windshield. The location of the external housing 112 can vary based on optical device positioning and the make and model of the vehicle 106. Additionally, external mounted optical devices allow for a selection of devices with specifications that best optimize a desired application. The size and shape of the external housing 112 can be constructed to minimize drag on the vehicle 106 while in motion.

Figure 2A:
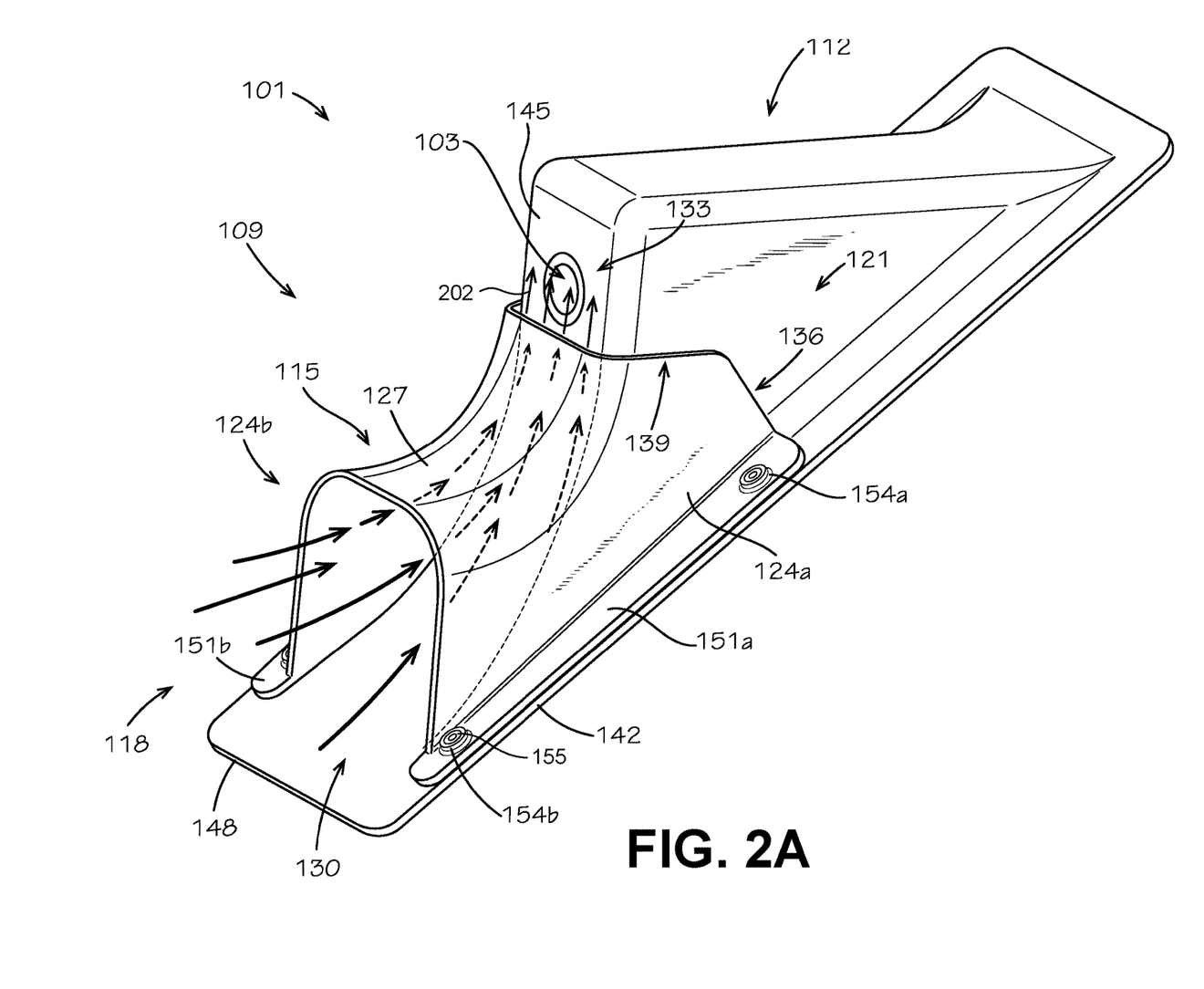
FIGS. 2A and 2B are enlarged views of the housing apparatus and the external housing from FIGS. 1A and 1B, according to various embodiments of the present disclosure.

Next, FIG. 2A illustrates an enlarged view of the housing assembly 101. As previously described, the housing assembly 101 can refer to the housing apparatus 109 and the external housing 112 for the optical device. In one non-limiting embodiment, the housing apparatus 109 includes a tunnel structure 115 that is configured to be attached to the external housing 112 of the optical device. The housing apparatus 109 can be manufactured from various materials.

The tunnel structure 115 includes a first end 118, a second end 121, a first side 124a, a second side 124b (collectively hereinafter "the sides 124"), and a top side 127. The first end 118 of the tunnel structure 115 has an entry opening 130 for capturing air flow. The air flow can be captured passively while the vehicle 106 is in motion. The entry opening 130 can allow for the air flow to enter an interior of the tunnel structure 115. The tunnel structure 115 can be positioned below the lens 103 of the optical device in order to minimize the amount of drag that the housing apparatus 109 adds to the vehicle 106. The orientation of the tunnel structure 115 can vary as well. For example, the tunnel structure 115 can be positioned to the side of the camera lens (see e.g., FIG. 4), above the camera lens, and in other suitable orientations. Another example, the tunnel structure 115 can be positioned in relation to a viewable window for the optical device. The viewable window may be comprised of glass, polycarbonate, and other suitable translucent/transparent materials.

The entry opening 130 can be formed by a first perimeter formed by the first side 124a, the second side 124b, and the top side 127. As shown in the FIG. 2A, the first perimeter corresponds to a two-dimensional plane that tilts toward the second end 121 of the tunnel structure 115. The first perimeter is tilted because the external housing 112 is also tilted for the positioning of the lens 103. The tilt for the first perimeter allows the entry opening 130 to capture an air flow that is directed in a substantially horizontal direction toward the housing apparatus 109. Additionally, the entry opening 130 has a bowed or U-shape from the first side 124a to the second side 124b. The shape and the tilt of the entry opening 130 can vary. In some embodiments, the entry opening 130 can include a screen that prevents objects from entering the interior of the tunnel structure 115. For example, the screen can be used to prevent insects, leaves, snow, and other suitable items from entering and clogging the interior of the tunnel structure 115.

The second end 121 of the tunnel structure 115 has an exit opening 133. The exit opening 133 can be configured to direct the air flow from the interior of the tunnel structure 115 to a lens 103 of the optical device or a viewable window for the optical device. The exit opening 133 can be formed by a second perimeter of the first side 124a, the second side 124b, and the top side 127. In some embodiments as shown in FIG. 2A, the exit opening 133 can be wrapped around a portion of the external housing 112. The first side 124a and the second side 124b of the tunnel structure 115 can be positioned along the sides of a protruding member 145 of the external housing 112, as shown in FIG. 2A. As such, the exit opening 133 wraps around a portion of the protruding member 145 of the external housing 112.

In some embodiments, the exit opening 133 comprises a flap that extends from the perimeter of the exit opening. The flap can be moved by the exiting air flow and can be used dislodge obstructions from the camera lens or the viewable window.

In some embodiments, as shown in FIG. 2A, the exit opening 133, at the second end 121, of the tunnel structure 115 has a second perimeter that includes a lateral portion 136 and a tilted portion 139. Additionally, the top side 127 of the tunnel structure 115 has an interior arcuate surface (FIG. 5A) from the entry opening 130 to the exit opening 133 along a length of the tunnel structure 115. The interior arcuate surface and a surface of the external housing 112 can be used to guide the air flow from the entry opening 130 to the exit opening 133. For instance, the surface of the external housing 112 can have a curved shape. As such, the curved shape of the external housing 112 and the interior arcuate surface can facilitate a change in the direction of the air flow from a substantially horizontal direction to a substantially vertical direction, in which the air flow can be directed to the lens 103 of optical device or a viewable window for the optical device. As such, in some examples, the direction of the air flow can be changed relatively about ninety degrees.

Likewise, the top side 127 also has an exterior arcuate surface (FIG. 5A) from the entry opening 130 to the exit opening 133 along a length of the tunnel structure 115. An external air flow that contacts the exterior arcuate surface can be directed to the lens 103 of the optical device. Although there is less ability to control the external air flow, the redirection of the external air flow can create a force to move obstructions on the lens 103 or from an area near the lens 103 of the optical device. The shape of the exterior arcuate surface and the interior arcuate surface can vary. The tunnel structure 115 has omitted a bottom side in FIG. 2A. As such, the air flow entering the interior of the tunnel structure 115 can contact the external housing 112. With the omission of a bottom side, the tunnel structure forms a slot opening that extends from the entry opening 130 to the exit opening 133. As such, the tunnel structure 115 can wrap around a protruding portion of the external housing 112.

Additionally, the external housing 112 protects the internal components of the optical device. The shape of the external housing 112 can vary due to various requirements, such as positioning for the optical device, the size of the optical components, the contour of the vehicle frame, minimizing vehicle drag, and other requirements. In the illustrated embodiment of FIG. 2A, the external housing 112 has a planar base 142 and a protruding member 145 that extends from the planar base 142. The planar base 142 can correspond to the contour of a portion of the vehicle's exterior surface. In FIG. 2A, the planar base 142 is tilted to correspond to the tilted exterior surface above the windshield of the vehicle 106.

The protruding member 145 is an enclosure for camera components. In FIG. 2A, the protruding member 145 has a protruding surface 148 that has an arcuate surface. The protruding surface 148 at a first end corresponds to the contour of the planar base 142. The protruding surface 148 transitions from the planar base 142 to a substantially vertical orientation at a second end. The tunnel structure 115 of the housing apparatus 109 can be positioned over the protruding surface 148. The tunnel structure 115 can be positioned such that the transition of the protruding surface 148 begins within the interior of the tunnel structure 115.

The protruding surface 148 has an aperture (FIG. 5A) and a lens 103 or cover for an optical device. The second end 121 of the tunnel structure 115 can wrap around a portion of the protruding surface 148 of the external housing 112. The second end 121 of the tunnel structure 115 can be constructed to conform to the shape of the protruding surface 148. Additionally, the second end 121 of the tunnel structure 115 can be positioned below and adjacent to the aperture for the lens 103 in the protruding member 145.

The tunnel structure 115 has a first flange 151a and a second flange 151b (collectively hereinafter "the flanges 151"). The first flange 151a can extend from the first side 124a, and the second flange 151b can extend from the second side 124b. The flanges 151 can serve as a base that corresponds to the planar base 142 of the external housing 112. In the illustrated embodiment, the flanges 151 are elongated, flat components. The entry opening 130 is tilted with respect to the flanges 151. An angle formed by a two-dimensional plane of the first perimeter of the entry opening 130 and the flanges 151 can be less than ninety degrees (e.g., see also FIG. 5A).

The flanges 151 can include one or more flange apertures 154a, 154b (collectively hereinafter "the flange apertures 154"). The flange apertures 154 can correspond to mounting protrusions 155 from the external housing 112. The flange apertures 154 can have a raised lip that surrounds the mounting protrusions 155 from the external housing 112. In some embodiments, the flange apertures 154 can be receiving bosses (FIGS. 5A and 5B) as one example as shown in FIG. 2A. The flange apertures 154 (e.g., receiving bosses) can be a "through" hole that receives the mounting protrusions 155 from a bottom side and receives a fastener for from a top side. The mounting protrusions 155 can be a "blind" hole that extends from the external housing 112. The mount protrusions 155 can be inserted through the flange apertures 154. The fastener can be used for attaching the housing apparatus 109 to the external housing 112. The fastener can be inserted into the flange aperture 154 and the mount protrusions 155. A top side of the fastener can contact and restrain the mounting protrusion 155. In some examples, the fastener has threads that can penetrate the interior walls of the mounting protrusion 155 in order to attach the fastener to the mounting protrusion 155.

The lateral portion 136 of the second end 121 for the tunnel structure 115 can extend substantially perpendicular from the flanges 151. The tilted portion 139 of the second end 121 can correspond to a two-dimensional plane tilted toward the first end 118 with respect to the flanges 151. The lateral portion 136 and the tilted portion 139 of the second perimeter can form an angle that is greater than ninety degrees. Additionally, the tilted portion 139 of the second perimeter forms a bowed or U-shape that extends from the first side 124a to the second side 124b. The shape of the tilted portion 139 can vary.

Figure 2B:
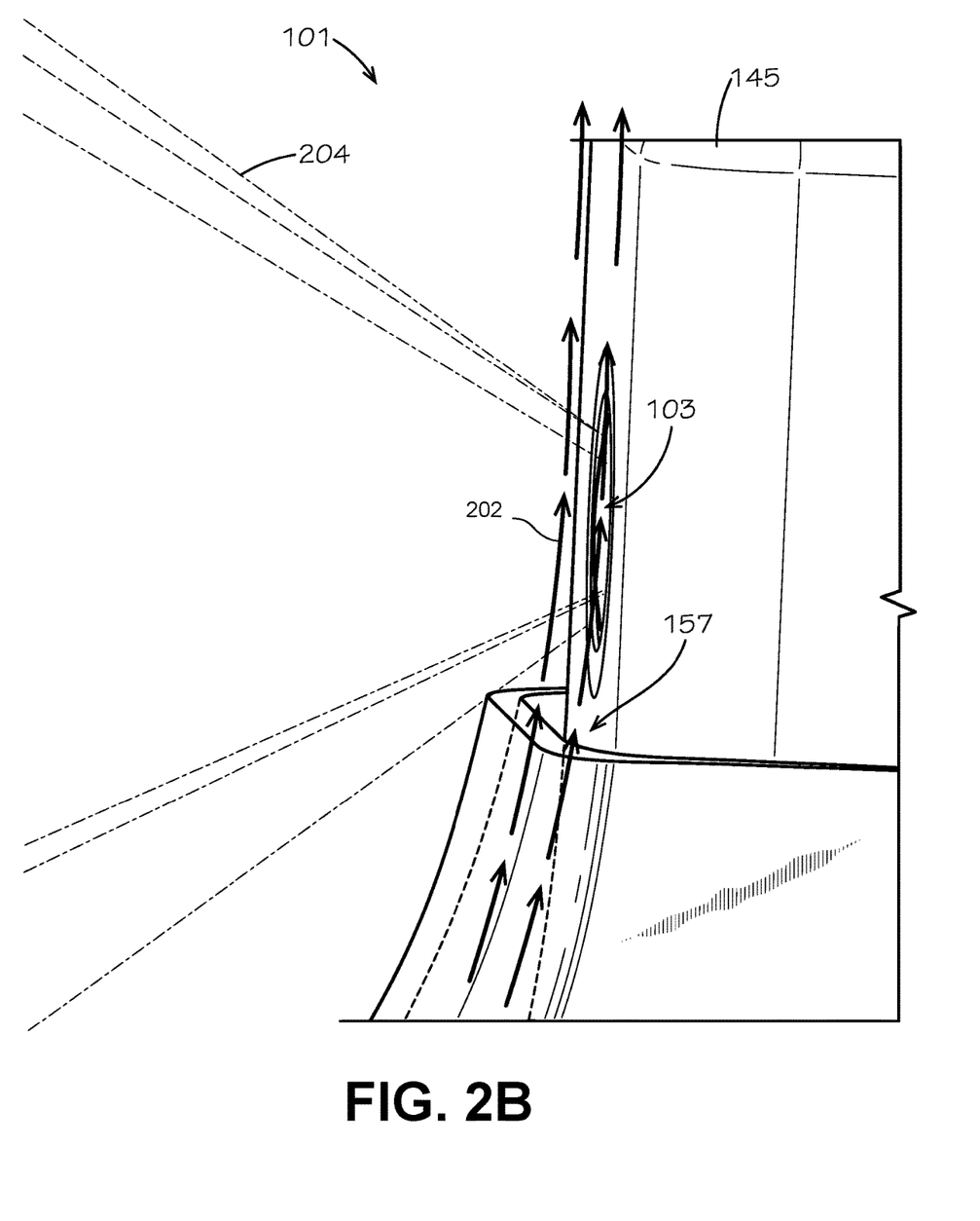

Moving on to FIG. 2B, shown is an enlarged side view of a portion of FIG. 2A. FIG. 2B illustrates an enlarged view of the second end 121 of the tunnel structure 115 and the second end 121 of the protruding surface 148 for the external housing 112. The second end 121 of the protruding surface 148 and the second end 121 of the tunnel structure 115 can form a slit 157 (e.g., a narrow slot). The slit 157 can be used for directing the air flow 202 from the interior of the tunnel structure 115 to the lens 103 of the optical device. The air flow 202 travels across a field of view 204 for the lens 103 of the optical device.

The air flow 202 exiting the slit 157 can be oriented in a substantially vertical direction or substantially 90 degrees from the horizontal air flow entering the entry opening 130. In some cases, the air flow 202 can be characterized as substantially all laminar flow. In other cases, the air flow 202 can be characterized as a combination of laminar flow and turbulent flow.

The size of the slit 157 can be designed based on the size the entry opening 130. In some embodiments, the surface area size of the entry opening 130 can be a size multiple of the surface area size of the slit 157. For example, the size multiple can be in a range from eight to fifteen times larger. Thus, for example, the surface area size of the entry opening 130 can be ten times larger than the surface area size of the slit 157. The difference in size between the openings can increase the speed of the air flow 202 leaving the slit 157. Other components can be manipulated to adjust the speed of the air flow 202 leaving the slit 157, such as altering the contour of the surface of the protruding member 145, altering the interior surfaces of the tunnel structure 115, and other suitable components.

The second end 121 of the housing apparatus 109 can terminate such that it does not obstruct the field of view of 204 of the lens 103 for the optical device. Thus, the second end 121 is adjacent to the lens 103, but does not block or interfere with the field of view 204 for the optical device.

Next, a general description of the operation of the various components of the housing assembly 101 is provided. To begin, a vehicle 106, such as a van, can be purchased by an entity to delivery packages. The entity can install the housing assembly 101 for one or more camera applications previously described.

During the install process, a hole (e.g., a mounting aperture) can be made in the vehicle exterior. The hole can be made above the windshield in order to provide an optimized field of view for the optical device. The hole can be used for routing the cables for the optical device. The external housing 112 can be positioned over the hole in the vehicle exterior. With the optical device contained within the external housing 112, the cables and other components can be routed through the hole. The housing apparatus 109 can be positioned such that the second end 121 straddles the protruding member 145 of the external housing 112. The flanges 151 can be secured to the external housing 112 with fasteners.

Ordinarily, as the vehicle 106 is in motion, debris can collect over the lens 103 of the optical device or a viewable window for the optical device. The debris can affect the performance of the optical device by blocking, clouding, or limiting the field of view 204. However, the housing apparatus 109 can be used to remove the debris by passively capturing an air flow 202 that is substantially horizontal and directing the air flow 202 in a substantially vertical direction. Additionally, the housing apparatus 109 can prevent debris from attaching or collecting on the lens 103 of the optical device.

The area of the entry opening 130 is substantially larger than the slit 157 formed between the exit opening 133 and the protruding surface 148 of the external housing 112. In fluid dynamics, Bernoulli's principle states that an increase in the speed of a fluid occurs simultaneously with a decrease in static pressure or a decrease in the fluid's potential energy. Because of Bernoulli's principle, the difference in size can cause an increase in the velocity of the air flow 202 leaving between the exit opening 133 and the protruding surface 148. The exiting air flow 202 has enough velocity to become a shearing force across the lens 103 of the optical device. The generated shearing force can remove obstructions that are on or near the lens 103 of the optical device.

Figure 3:
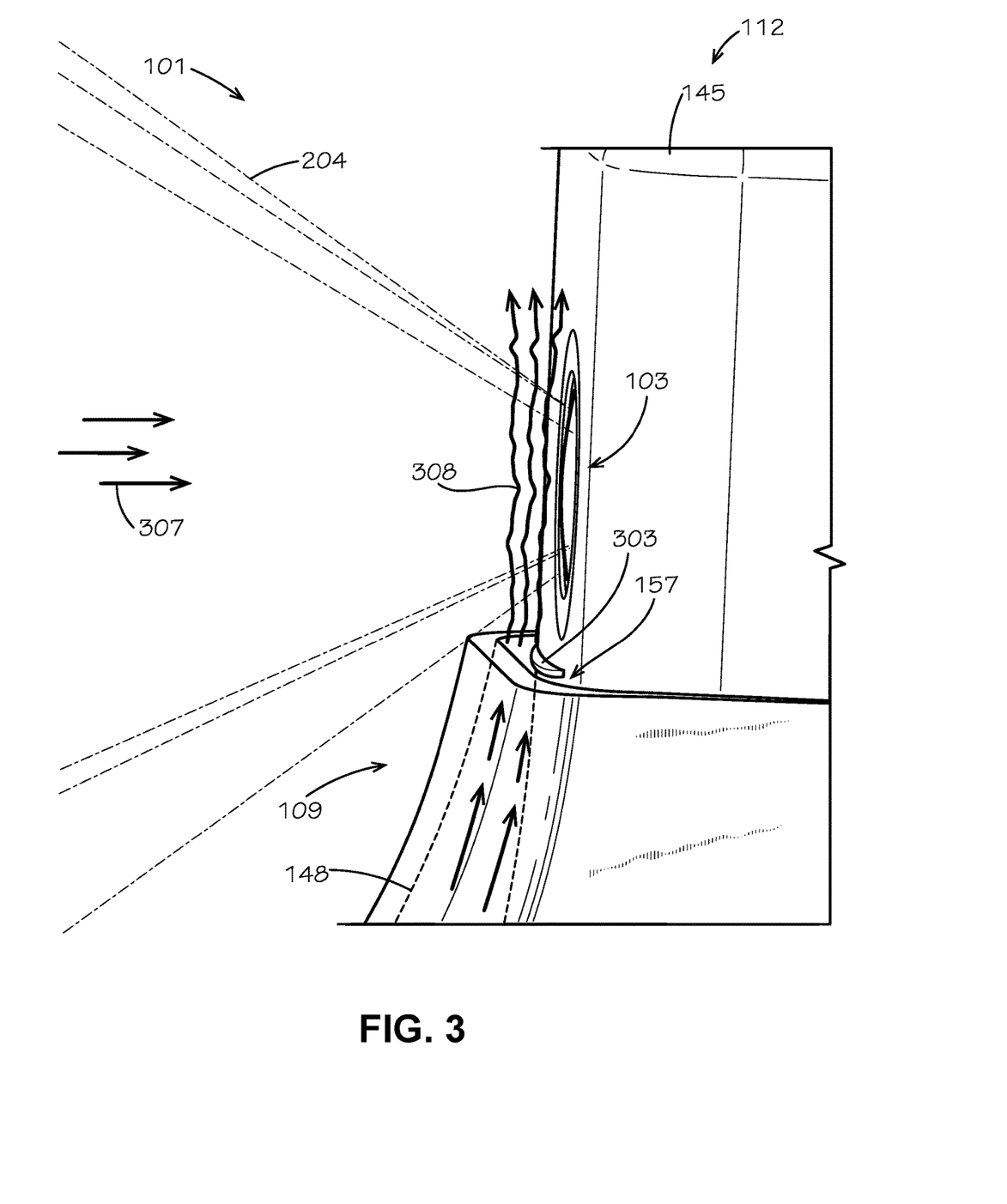
FIG. 3 is a drawing of the housing apparatus and an external housing that has a ridge according to various embodiments of the present disclosure.

Referring next to FIG. 3, shown is an external housing 112 of the housing assembly 100 having a ridge 303 for causing turbulence in the air flow. The ridge 303 can be positioned at various locations along the protruding surface 148. In some examples, the ridge 303 can be positioned at a certain distance from the camera lens. For example, the distance from the ridge 303 to the camera lens can be in a range from zero to ten centimeters.

The ridge 303 can be constructed in different shapes with different orientations. In the illustrated embodiment, the ridge 303 is depicted as a raised edge that extends laterally across the area near the slit 157. In another embodiment, one or more ridges 303 can be positioned in the interior surfaces of the housing apparatus 109. For example, the ridges 303 can be positioned along the interior surface of the top side 127 or along the interior wall of the sides 124 of the housing apparatus 109. As another example, the ridge 303 can be on a lip of the housing apparatus 109 extending toward area below the lens 103 of the optical device. Additionally, the ridge 303 can be positioned before or after the exit opening 133 and/or the slit 157 on the protruding surface 148.

The ridge 303 can cause turbulence in the air flow, and the turbulence can vary the impact of the air flow for removing obstructions near or on the lens 103 of the optical device. The variations in the air flow can be useful in removing obstructions or in prevent potential obstructions from attaching to the lens 103. In FIG. 3, the modified air flow is illustrated by the wavy air flow indicators 308.

Ordinarily, the vertical air flow streams leaving the slit 157 that are close to the protruding surface 148 that could be characterized by laminar flow, in which the air flow streams near the protruding surface 148 are parallel to the protruding surface 148. The vertical air flow streams that are farther away could be characterized as turbulent flow. The ridge 303 can increase the turbulent flow. In some examples, separate air streams that directly approach the camera lens in a substantially horizontal direction (see e.g., reference number 307) can contact the turbulent flow from the vertical air flow streams. The combination of the vertical air flow streams and the substantially horizontal air flow streams can create the wavy air flow stream indicated by the wavy air flow indicators 308.

In some embodiments, the ridge 303 may be a bump or a wavy contour for causing turbulence in the air flow. The shape of the surface of the ridge 303 can vary in order to cause different turbulent effects. In some embodiments, the protruding surface 148 can have one or more recessed areas for creating a turbulence to the air flow passing through the tunnel structure 115 (FIG. 2A).

Figure 4:
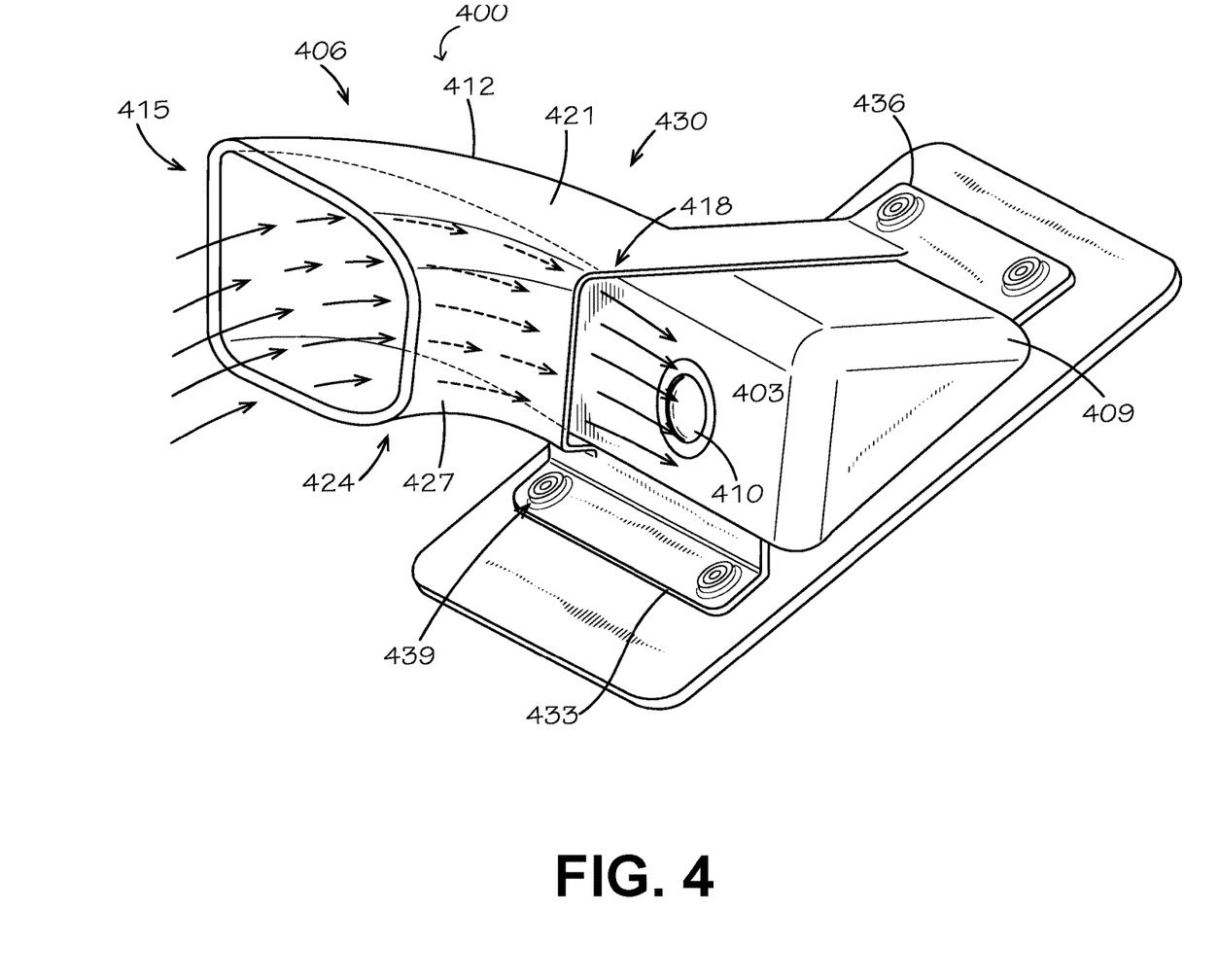
FIG. 4 is a drawing of an alternative orientation for the housing apparatus from FIG. 1 according to various embodiments of the present disclosure.

Turning now to FIG. 4, shown is an alternative housing assembly 400 for a camera 403. The alternative housing assembly 400 refers to an alternative housing apparatus 406 and an alternative external housing 409 for the camera 403. FIG. 4 illustrates that the alternative housing apparatus 406 has a different orientation from the housing apparatus 109 from FIG. 1. Additionally, the alternative external housing 409 has a different shape than the external housing 112 from FIG. 1. Further, the alternative externing housing 409 has a viewable window 410 for the camera 403. The lens of the camera 403 captures imagery through the viewable window 410.

The alternative housing apparatus 406 has a side tunnel structure 412 that includes a side entry opening 415 and a side exit opening 418. The side tunnel structure 412 is configured to capture an air flow from the side entry opening 415 and direct to the air flow to the lens of the camera 403 from the side exit opening 418. In this alternative embodiment, the side tunnel structure 412 is positioned to the side of the camera 403.

The side tunnel structure 412 has a top side 421, a bottom side 424, a front side 427, and a back side 430. At a first end, the side tunnel structure 412 includes the side entry opening 415 formed by a first perimeter of the top side 421, the bottom side 424, the front side 427, and the back side 430. At a second end, the side tunnel structure 412 includes the side exit opening 418 formed by a second perimeter of the top side 421, the bottom side 424, the front side 427, and the back side 430. The side exit opening 418 is configured such that a portion of the camera 403 can be positioned within it. The side exit opening 418 can cover a portion of the front, the side, and the rear of the camera 403.

The alternative housing apparatus 406 is also a front flange 433 and a rear flange 436. The front flange 433 can extend from the front side 427 and/or the bottom side 424. The rear flange 436 can extend from the back side 430 and/or the bottom side 424. The front flange 433 and the rear flanges 436 can include one or more apertures 439 for attaching the alternative housing apparatus 406 to the alternative external housing 409 and/or an area surrounding the alternative external housing 409.

In other embodiments, the tunnel structure can be constructed for other orientations. For example, a different tunnel structure can be positioned above the camera lens. In this embodiment, the tunnel structure could capture an air flow above the camera lens and direct the air flow downward across the camera lens.

Figure 5A:
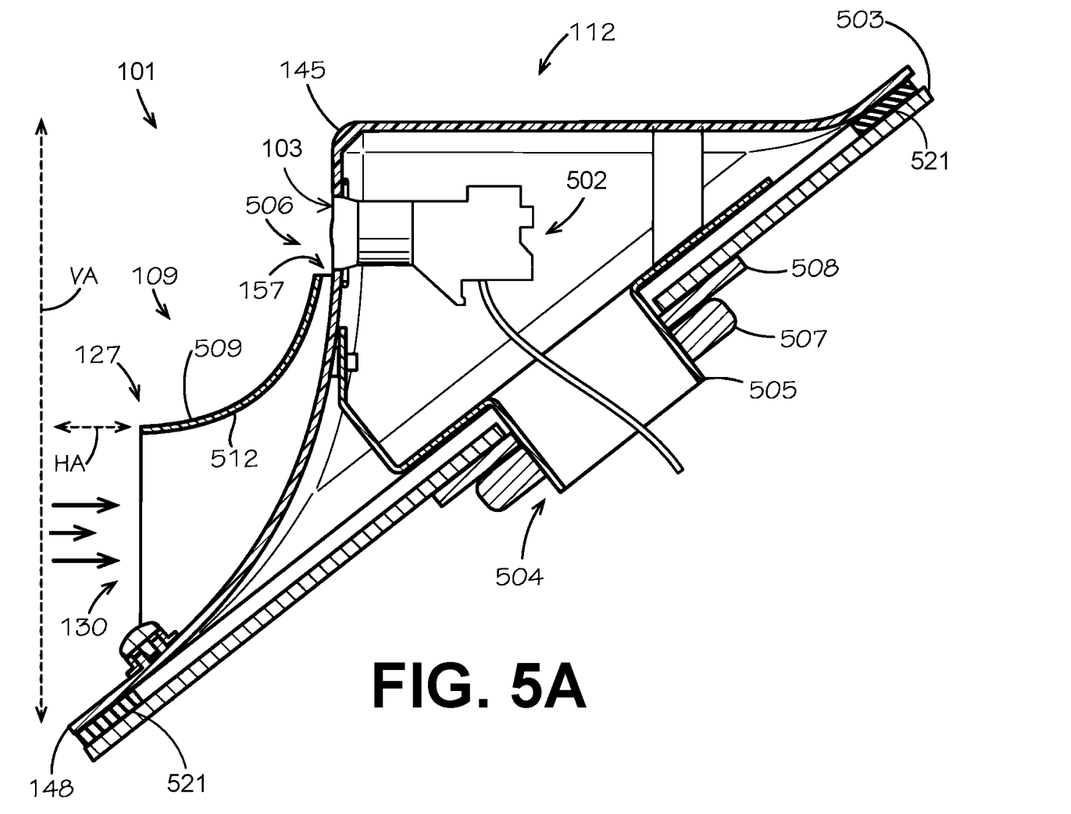
FIGS. 5A and 5B are cross sectional views of the housing apparatus and the external housing according to various embodiments of the present disclosure.
Figure 5B:
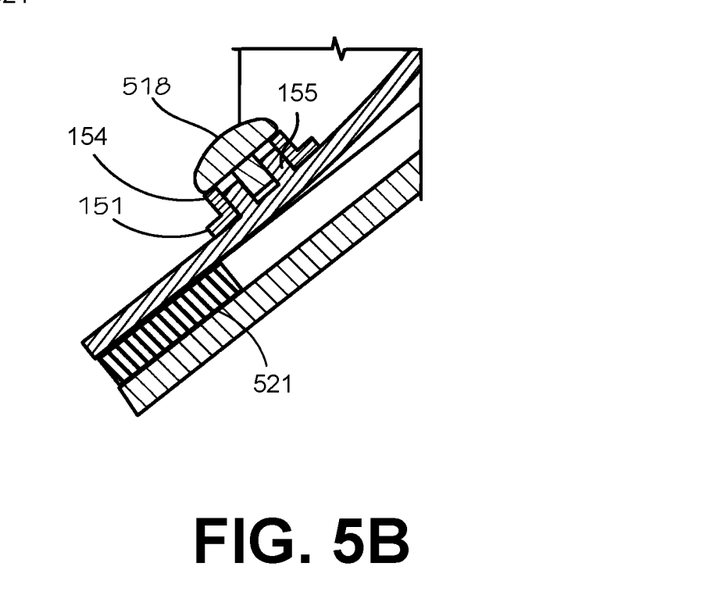

Referring to FIGS. 5A and 5B, shown are cross sectional views of the housing assembly 101 from FIG. 1. FIG. 5A is a cross sectional view of the housing apparatus 109, the external housing 112, the lens 103, and the optical device 502. FIG. 5A illustrates that the protruding member 145 is an enclosure for the camera components outside of the vehicle exterior 503. The external housing 112 is placed over a mounting aperture 504 in the vehicle exterior 503. FIG. 5A also illustrates a conduit 505, a nut 507, and a washer 508. The conduit 505 can be attached to the external housing 112. The nut 507 and the washer 508 can be used to secure the conduit 505 and the external housing 112 to the vehicle 106.

FIG. 5A illustrates that the slit 157 at the second end 121 is adjacent to the lens 506 for the of the optical device 502. In FIG. 5A, the entry opening 130 corresponds to a vertical axis "VA". The top side 127 corresponds to a horizontal axis "HA" at the first end 118 of the tunnel structure 115. In some embodiments, after the air flow enters the entry opening 130, the air flow contacts the protruding surface 148 and is guided toward the slit 157. FIG. 5A also illustrates that the air flow can contact the protruding surface 148 since a bottom side of the tunnel structure 115 is omitted from the housing apparatus 109. Additionally, FIG. 5A illustrates that the top side 127 of the tunnel structure 115 has an exterior top surface 509 and an interior top surface 512. The exterior top surface 509 and the interior top surface 512 have an arcuate shape. As shown in FIG. 5A, the exterior top surface 509 and interior top surface 512 have a greater arch than the protruding surface 148 from the external housing 112.

In another embodiment, the lens 506 for the optical device 502 may be comprised of a translucent material. The translucent material can include polycarbonate material or other suitable durable, translucent materials.

FIG. 5B is an enlarged view of a portion of a flange 151 near the first end of the tunnel structure 115 from FIG. 5A. The flange aperture 154 (e.g., receiving boss) can receive a fastener 518 for attaching the housing apparatus 109 to the external housing 112. The fastener 518 is prevented from penetrating the external housing 112 and the vehicle exterior 503 in order to reduce the likelihood of water intrusion. A sealing material 521 can be used in between the external housing 112 and the vehicle exterior 503. The sealing material 521 can be used to create a seal around the external housing 112 in order to prevent water intrusion. The sealing material 521 can include adhesive tape, caulking material, a gasket, and other suitable forms of compliant sealing material. In some examples, the adhesive tape can include double-sided Very High Bonding (VHB) tape from 3M®. In some examples, the gasket can be a rubber gasket that has an adhesive layer. In other examples, the gasket may not have an adhesive layer. The sealing material 521 can be compressed 20%-50% by a nut 507, a washer 508, and other suitable components in order to provide a good seal from water intrusion.

The mounting protrusion 155 can be a blind hole boss. The fastener 518 can be a thread forming screw, and the threads can be used to penetrate interior sidewalls of the mounting protrusion 155. The flange apertures 154 can be a "through" hole that receives the mount protrusion 155 from a bottom side and receives a fastener 518 from a top side.

Figure 6:
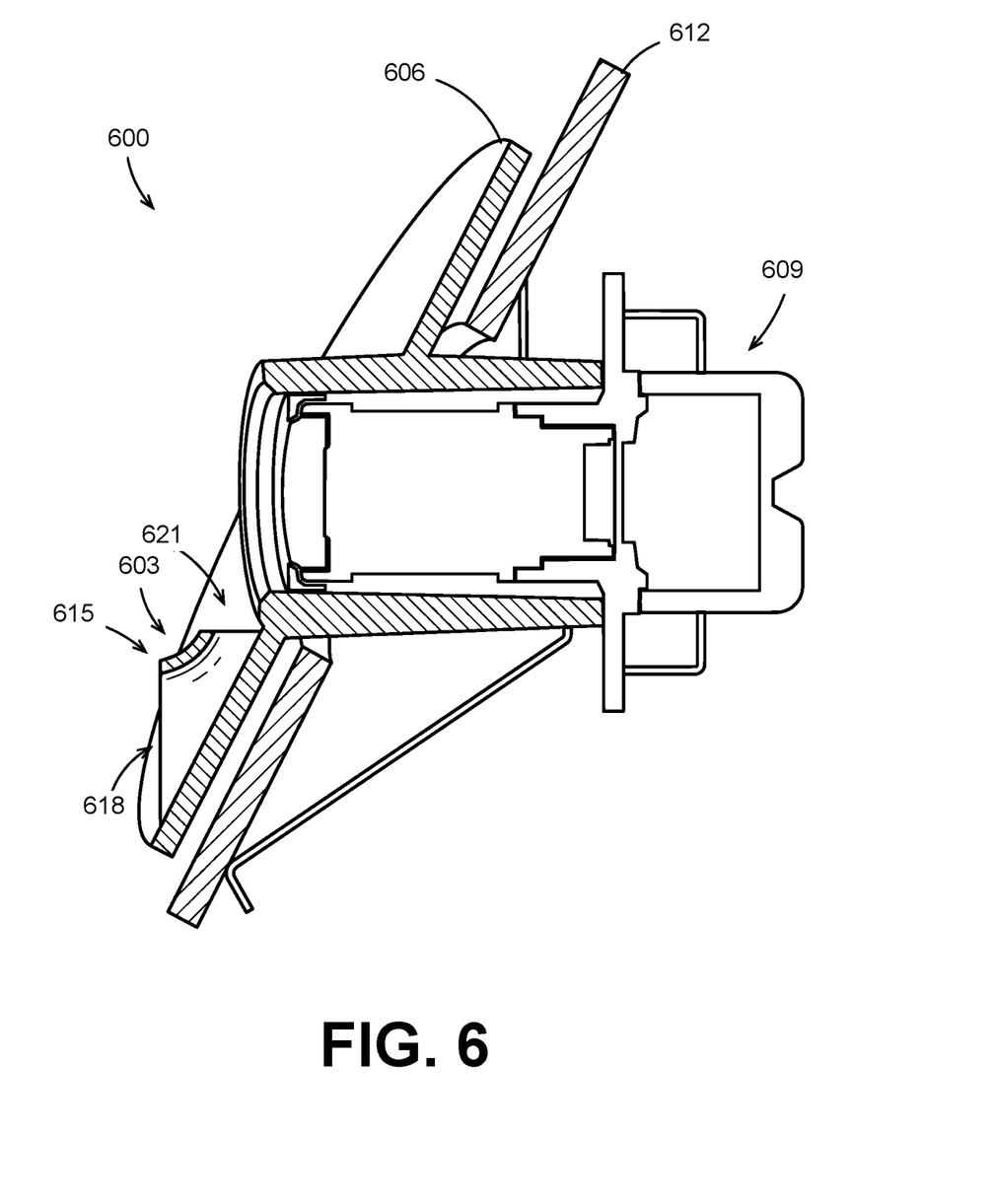
FIG. 6. is a drawing of a housing apparatus attached to an external housing for an internal vehicle-mounted camera according to various embodiments of the present disclosure.

Moving on to FIG. 6, shown is an integrated housing assembly 600. The integrated housing assembly 600 includes an integrated housing apparatus 603, an integrated external housing structure 606, and a recessed camera 609. In contrast to FIGS. 2A and 5A, in FIG. 6, the recessed camera 609 has at least a first portion of the recessed camera 609 recessed within an opening of the vehicle frame 612. A second portion, if any, of the recessed camera 609 may protrude through the opening of the vehicle frame 612. The integrated housing assembly 600 can be useful in some vehicle designs because the integrated housing assembly 600 has a smaller profile than other embodiments. The smaller profile can minimize the drag force that is added by the various embodiments. The integrated external housing structure 606 is an enclosure for the second portion of the recessed camera 609 that is protruding through the opening of the vehicle frame 612.

The integrated housing apparatus 603 includes a tunnel structure 615 that has a first end, a second end, a first side, a second side, and a top side. The tunnel structure 615 is configured to be attached to the integrated external housing structure 606 for the recessed camera 609. The tunnel structure 615 includes an entry opening 618 at the first end of the tunnel structure 615 that is configured to capture an air flow and direct the air flow along a surface of the external housing structure 606. The entry opening 618 is configured to passively capture the air flow from a substantially horizontal direction while the vehicle is in motion.

The tunnel structure 615 includes an exit opening 621 at the second end. The exit opening 621 is configured to direct the air flow to a substantially vertical direction through the slit at the lens of the camera. The exit opening 621 is positioned below the camera lens.

The top side has an interior arcuate surface from the entry opening 618 to the exit opening 621 along a length of the tunnel structure. The top side also has an exterior arcuate surface from the entry opening 618 to the exit opening 621 along a length of the tunnel structure 715.

Figure 7:
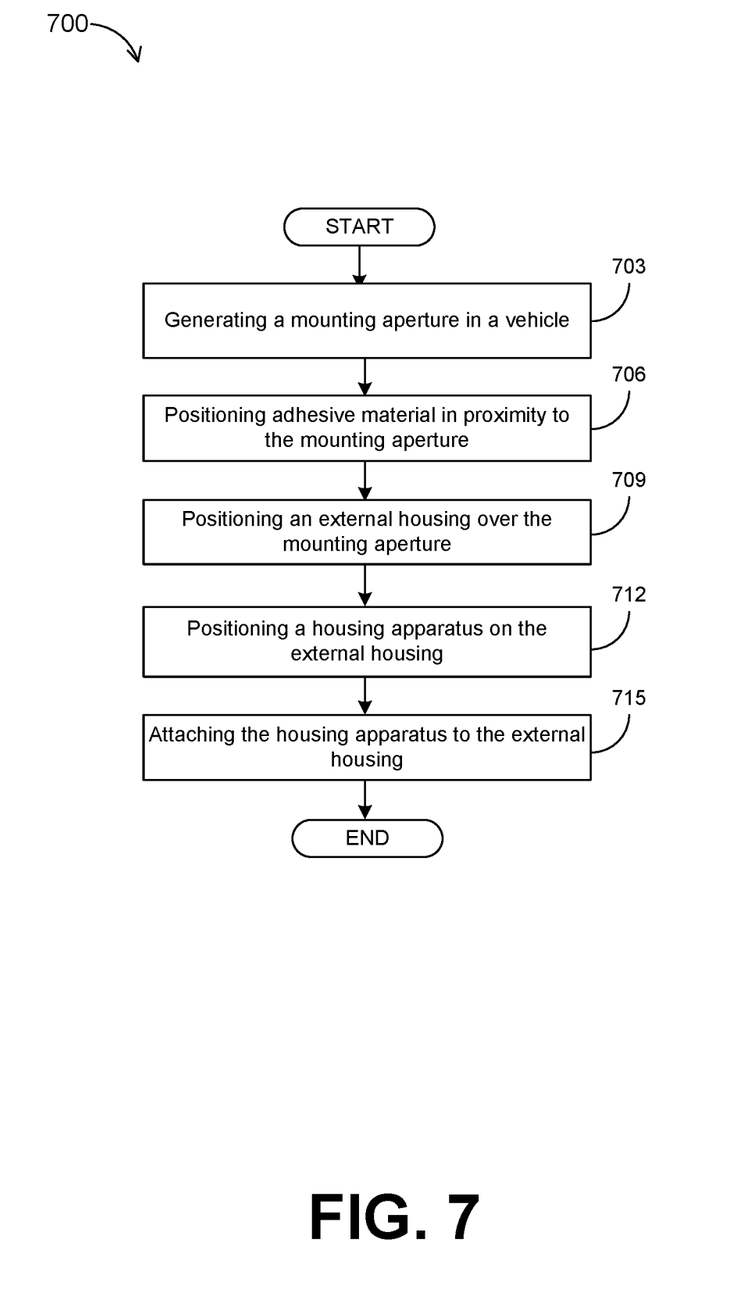
FIG. 7 is a flowchart illustrating an example process for installing the housing assembly of FIGS. 1A and 1B according to various embodiments of the present disclosure.

Referring next to FIG. 7, shown is a flowchart that provides an example process 700 for installing the housing assembly of FIGS. 1A and 1B in a vehicle according to various embodiments. It is understood that the flowchart of FIG. 7 provides merely an example of the many different types of sequences or methods that may be employed for installing the housing assembly 101.

Beginning with box 703, the process 700 includes generating a mounting aperture 504 in a vehicle exterior 503 of the vehicle 106. The mounting aperture 504 can be positioned in an area that would provide an optimized field of view for the camera 103. For example, the mounting aperture 504 can be situated above the window shield of the vehicle 106 in a substantially center location. The contour (e.g., arch and/or slant) of the vehicle exterior 503 can be considered in the positioning of the mounting aperture 504 because of the slant of the flanges 151 for the housing apparatus 109. The slant of the flanges 151 and the contour of the vehicle exterior 503 can affect the field of view in the external housing 112.

In box 706, the process 700 includes positioning sealing material 521 on the vehicle exterior 503 in proximity to the mounting aperture 504. The sealing material 521 can be placed in areas on the vehicle exterior 53 where a perimeter of the external housing 112 will be placed. In an alternative embodiment, the sealing material 521 can be placed along a perimeter of the external housing 112.

In box 709, the process 700 includes placing the external housing 112 over the mounting aperture 504. The external housing can be placed on the sealing material 521. While placing the external housing 112, camera components (e.g., cables, etc.) can be routed through the mounting aperture 504 and into the interior of the vehicle 106.

In box 712, the process 700 includes positioning a first side 124a and a second side 124b of the housing apparatus 109 to straddle a protruding member 145 of the external housing 112. The second end 121 of the tunnel structure 115 and a protruding surface 148 of the protruding member 145 can form a slit 157 (e.g., a slot) in proximity to a lens of a camera 103 or a viewable window for the camera 103.

In box 715, the process 700 includes attaching the housing apparatus 109 to the external housing 112. The flanges 151 can include flange apertures 154. Receiving bosses 151 from the external housing 112 can be inserted through the flange apertures 154. A fastener 518 can be inserted into the receiving boss 515. In some embodiments, the fastener 518 is a thread-forming screw. As such, the fastener 518 can penetrate the interior wall of the receiving boss 515 in order to attach the housing apparatus 109 to the external housing 112. The fastener 518 can include a top end that has a diameter larger than the flanges apertures 154 and the receiving bosses 151. In some embodiments, a nut or the fastener 518 can be used to compress the sealing material 521 between the external housing 112 and the vehicle exterior 503. In some examples, the thickness of the sealing material 521 can be compressed in a range between 10 percent to 70 percent of the initial thickness. Then, the process 700 proceeds to the end.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a vehicle;
    a camera mounted externally on the vehicle;
    an external housing for the camera, the external housing being mounted on the vehicle and having a protruding surface;
    a housing apparatus that includes a tunnel structure, the tunnel structure being configured to be attached to the external housing, the tunnel structure comprising:
    a first end, a second end, a first side, a second side, and a top side, the first side extending from a first flange and the second side extending from a second flange;
        an entry opening at the first end of the tunnel structure is configured to direct an air flow within the protruding surface of the external housing; and
        an exit opening at the second end of the tunnel structure, the protruding surface of the external housing and the exit opening forming a slit for directing the air flow to a lens for the camera.

2. The system of claim 1, wherein the exit opening has a perimeter that wraps around a portion of the protruding surface of the external housing.

3. The system of claim 1, wherein the top side has an arcuate interior surface from the entry opening to the exit opening along a length of the tunnel structure.

4. The system of claim 1, wherein the entry opening has a perimeter that tilts toward the second end.

5. A housing apparatus for removing obstructions from a lens of an optical device attached to a vehicle, comprising:
    a tunnel structure that has a first end, a second end, a first side, a second side, and a top side, the tunnel structure being configured to be attached to an external housing, the external housing having a lens for an optical device mounted on a vehicle;
    a first flange and a second flange, wherein the first side extends from the first flange and the second side extends from the second flange;
    an entry opening at the first end of the tunnel structure is formed by a first perimeter of the first side, second side, and the top side, at least a portion of the first perimeter being tilted toward the second end, the entry opening being configured to capture air flow while the vehicle is in motion; and
    an exit opening at the second end of the tunnel structure is formed by a second perimeter of the first side, second side, and the top side, the exit opening being configured to a direct the air flow from the entry opening to the lens of the optical device, the top side having an arcuate interior surface from the entry opening to the exit opening along a length of the tunnel structure.

6. The housing apparatus of claim 5, wherein a portion of the second perimeter corresponds to a two-dimensional plane tilted toward the first end with respect to the first flange or the second flange.

7. The housing apparatus of claim 5, wherein the entry opening corresponds to a two-dimensional plane tilted toward the second end with respect to the first flange or the second flange.

8. The housing apparatus of claim 5, wherein the second perimeter of the exit opening comprises a lateral portion and a tilted portion, and the lateral portion transitions to the tilted portion.

9. The housing apparatus of claim 8, wherein the lateral portion extends from at least one of the first flange or the second flange.

10. The housing apparatus of claim 8, wherein the tilted portion of the second perimeter forms a bowed shape that extends from the first side to the second side.

11. The housing apparatus of claim 8, wherein the lateral portion and the tilted portion of the second perimeter form an angle that is greater than ninety degrees.

12. The housing apparatus of claim 5, further comprising a first flange and a second flange, wherein the first flange comprises a first recessing boss, and the second flange comprises a second receiving boss.

13. The housing apparatus of claim 5, wherein the top side has an arcuate exterior surface that extends from the entry opening to the exit opening.

14. A method of installing a housing assembly for a light-sensing sensor installed on a vehicle, comprising:
    generating a mounting aperture in an exterior surface of a vehicle;
    positioning sealing material in proximity to the mounting aperture;
    placing an external housing for a light-sensing sensor over the mounting aperture and on the sealing material, the external housing having a lens for the light-sensing sensor;
    positioning a first side and a second side of a housing apparatus to straddle a protruding member of the external housing, the housing apparatus comprising a tunnel structure with an entry opening and an exit opening, the exit opening of the tunnel structure and a surface of the protruding member forming a slot in proximity to the lens for the light-sensing sensor, the exit opening is configured to direct the air flow to a substantially vertical direction through the slot at the lens of the light-sensing sensor, wherein the exit opening is positioned below the light-sensing sensor; and
    attaching the housing apparatus to the external housing.

15. The method of claim 14, wherein the entry opening is configured to passively capture the air flow from a substantially horizontal direction while the vehicle is in motion.

16. The method of claim 14, wherein the tunnel structure comprises a top side, and the top side has an arcuate interior surface from the entry opening to the exit opening along a length of the tunnel structure.

17. The method of claim 14, wherein the tunnel structure comprises a top side, and the top side has an arcuate exterior surface from the entry opening to the exit opening along a length of the tunnel structure.

* * * * *